(12) United States Patent
Bundschu et al.

(10) Patent No.: US 6,241,229 B1
(45) Date of Patent: Jun. 5, 2001

(54) MACHINE FOR PROCESSING METAL PLATE

(75) Inventors: Stephan Bundschu, Stuttgart; Werner Erlenmaier, Gerlingen; Wolfgang Laib, Besigheim, all of (DE)

(73) Assignee: Trumpf GmbH & Co. (DE)

( * ) Notice: Subject to any disclaimer, the term of this patent is extended or adjusted under 35 U.S.C. 154(b) by 0 days.

(21) Appl. No.: 09/273,130

(22) Filed: Mar. 19, 1999

(30) Foreign Application Priority Data

Mar. 21, 1998 (DE) .......................................... 298 05 195 U

(51) Int. Cl.$^7$ ....................................................... B23Q 1/22
(52) U.S. Cl. ................................ 269/73; 267/71; 267/60; 267/58
(58) Field of Search .................................. 269/73, 71, 60, 269/58

(56) References Cited

U.S. PATENT DOCUMENTS

| | | | |
|---|---|---|---|
| 2,862,410 | * 12/1958 | Meyer | 269/60 |
| 4,392,642 | * 7/1983 | Chityat | 269/73 |
| 4,409,860 | * 10/1983 | Moriyama et al. | 269/60 |
| 4,565,358 | * 1/1986 | Hosoi et al. | 269/60 |
| 4,802,567 | * 2/1989 | Ikeda et al. | 268/58 |
| 5,022,619 | * 6/1991 | Mamada | 269/73 |
| 5,171,002 | * 12/1992 | Herke et al. | 269/73 |
| 5,207,115 | * 5/1993 | Takei | 269/73 |
| 5,388,316 | * 2/1995 | MacLaren | 269/47 |
| 5,752,821 | * 5/1998 | Jo | 269/54.2 |
| 6,017,597 | * 1/2000 | Minakami et al. | 428/34.4 |
| 6,047,958 | * 4/2000 | Marinkovic | 269/43 |

FOREIGN PATENT DOCUMENTS

| | | |
|---|---|---|
| 20 49 237 | 4/1972 | (DE) . |
| 31 09 862 | 10/1982 | (DE) . |
| 32 08 989 | 9/1983 | (DE) . |
| 33 39 340 | 5/1984 | (DE) . |

* cited by examiner

Primary Examiner—Derris H. Banks
Assistant Examiner—Lee Wilson
(74) Attorney, Agent, or Firm—Pepe & Hazard LLP

(57) ABSTRACT

A machine tool for processing of plate-like workpieces (9) includes a machine frame with a work table (8), and a coordinate guide (10) by which the workpiece is movable above the work table (8). A guide rail (11) of the coordinate guide (10) is mounted on the machine frame to be movable in one coordinate direction (y) and movably carries at least one workpiece support (12) in the other coordinate direction (x) The guide rail (11) projects in the direction (x) beyond at least one side of the work table (8) to provide an overhang facing the work table (8) on which is provided a workpiece support. Between the overhang of the guide rail (11) and the machine frame is provided a self-supporting plate 16,17 reinforcing element which is movable with the guide rail (11) to support it on the machine frame against distortion and displacement and its surface provides workpiece support.

5 Claims, 2 Drawing Sheets

MACHINE FOR PROCESSING METAL PLATE

BACKGROUND OF THE INVENTION

The present invention is directed to a machine for the processing of plate-like workpieces, in particular sheet metal, which have a machine frame, a worktable, and a guidance system for moving the workpiece thereabout.

Generally, modern punch presses and like stamping machines have a work table and at least one processing station. A coordinate guide moves the workpiece over the work table parallel to the plane of the work table in two coordinate directions extending perpendicular to each other. This includes a guide rail mounted on the machine frame and movable in the one coordinate direction, and the rail carries at least one workpiece support movable in the other coordinate direction.

In German patent publication DE-A-22 64 852 a revolving punch press is shown in which a machine base with a work table has a guide rail upon which there is mounted a cross-sliding carriage holding the workpiece to be processed. This guide rail is movable in a coordinate direction parallel to the plane of the work table. The cross-sliding carriage at the same time is movable on the guide rail in its longitudinal direction and is consequently movable crosswise to the direction of the sliding of the guide rail. The guide rail and cross-sliding carriage form the coordinate guide of the previously known machine tool.

In its longitudinal direction the guide rail projects on both sides over the work table on the machine base. The fixed work table on the machine base together with two side tables which are movable with the guide rail and engaged with the overhangs of the guide rail to monide the workpiece support. Sliding guide carriages are used for guiding and supporting of the side tables on the machine base and these carriages are also attached to the guide rail and work together with corresponding guide implements on the machine base. The cross-sliding carriage is movable on the guide rail in its longitudinal direction and has clamps for the firm gripping of the sheet metal workpiece to be processed.

During practical implementation of the machines of the type known from German patent publication DE-A-22 64 852, undesired distortions and displacements of the guide rail have adversely occurred. These manifestations were in particular the result of the inertia of the masses being accelerated with the guide rail during machine operation, for example, the cross-sliding carriage mounted on the guide rail, the workpiece held to the guide rail over the cross-sliding carriage and/or of the side tables fastened to the guide rail including the elements for the guiding and supporting of the side tables on the machine base.

To avoid the described undesired distortions and displacements of the guide rail, machines are presently being used to form a unique type. For the reinforcement of the coordinate guide, machines are being supplied with reinforcing elements as seen in German patent publication DE-A-22 64 852. These elements support the guide rail on the machine frame against distortion and displacement in at least one plane running parallel to the plane of the work table. Supports that run between the overhangs of the guide rail and the machine frame and that are moved together with the guide rail come into use as reinforcing elements. The application of such supports then leads to an enlargement of the mass to be supported on the machine frame and to be accelerated together with the guide rail. This in turn requires an appropriate design of the machine frame with respect to its load-bearing capacity. The necessary reinforcement of the coordinate guide on the machines currently in use connect a relatively large mass and this is added to the relatively large weight of the coordinate guide and thereby the entire machine.

The present invention has aimed to enable an improvement in this regard.

SUMMARY OF THE INVENTION

In accordance with the present invention, the identified problem is solved by means of supplying a self-supporting plate as a reinforcing element on the machine which has a surface forming at least one part of the workpiece support. On machines in accordance with the invention, the self-supporting plate takes on a double function. Firstly, it is used for a reinforcement of the coordinate guide, in particular as a support of moment for the guide rail; secondly, it takes on the function of an indispensable workpiece support that augments the work table of the machine frame or a proportionate dimension of the workpiece to be processed. The advantage of the invention can be appreciated from the application of a separate component, serving exclusively for the reinforcement of the coordinate guide.

In the development of the invention, the self-supporting plate is supported and movable with the guide rail above a support bearing on the machine frame facing this bearing. Crosswise to its sliding direction the support provided by the support bearing is thoroughly free of play.

In the preferred design of the machine in accordance with the invention, the self-supporting plate is formed as a hollow chamber plate. The application of a hollow chamber plate as a workpiece support brings with it a considerable savings in weight with respect to the conventional side tables used as supplementary to the workpiece table of the machine frame.

In the interest of a maximal self-supporting stability with minimal mass as well as minimal weight in the case of a further preferred variant of the machine in accordance with the invention, it is intended that the self-supporting plate will exhibit an inner honeycomb structure with honeycomb partitions running in a crosswise direction to the plane of the plate.

A further design of the invention concerns a machine suitable to the type whose guide rail projects on both sides of the workpiece table with in each case an overhang facing the work table. On each of the overhangs of the guide rail is provided a workpiece support forming a workpiece contact in cooperation with the work table, and a reinforcing element is provided between each of the overhangs of the guide rail and the machine frame. In development of the invention in the interest of minimizing the mass that is to be moved with the guide rail, both reinforcing elements are formed as self-supporting plates and as providing a surface which is a part of the workpiece support.

In the following, the invention is explained more closely with the aid of schematic representations for an example of implementation.

DETAILED DESCRIPTION OF THE ILLUSTRATED EMBODIMENT

Figure 1:
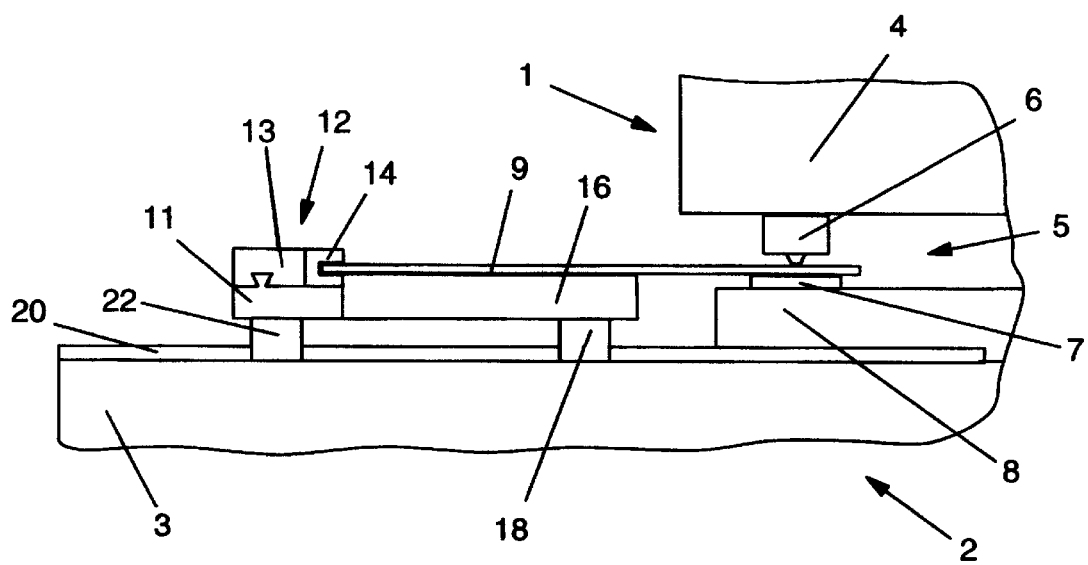
FIG. 1 shows a partial side view of a punch press with self-supporting plates for the reinforcement of the coordinate guide of the press.

As shown by FIG. 1, a punch press 1 includes a machine frame 2 with a lower part 3 and an upper part 4 that is vertically spaced from the lower part 3. In the open space between the lower part 3 and the upper part 4 is a processing station in the form of a conventional punching station 5 with a stamping implement upper part or punch 6 and a stamping implement lower part or die 7. The stamping implement lower part 7 is the matrix and is mounted on the work table 8 and thus firmly fixed in the lower part 3 of the frame.

Figure 2:
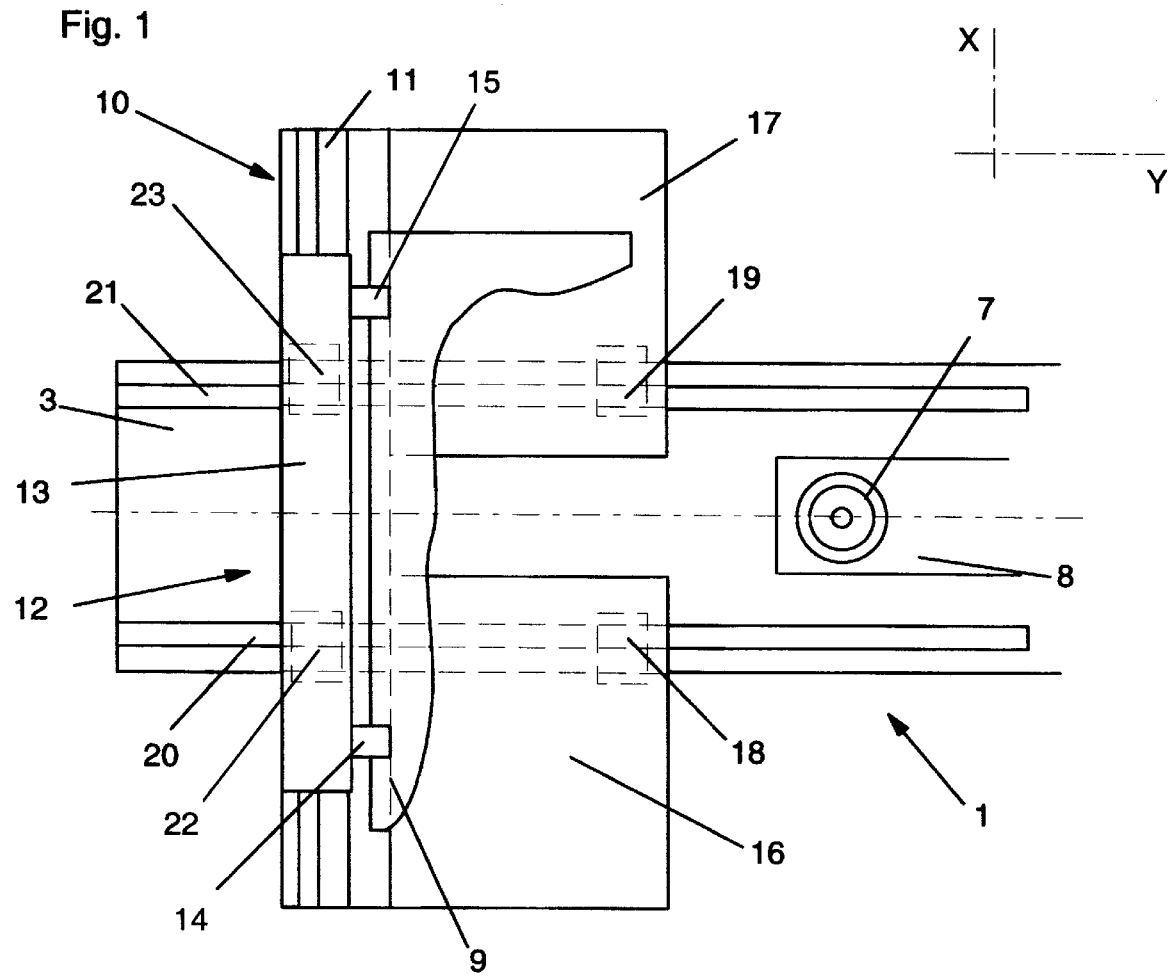
FIG. 2 shows a top view of the lower part of the punch press.

The punching station 5 is used to process a piece of sheet metal 9 which can be moved about the work table 8 by means of a coordinate guide 10 in a plane parallel to the plane of the work table in two coordinate directions (x), (y) (as seen in FIG. 2) which are perpendicular to each other and thereby can be shifted into a processing position in the punch station 5.

The coordinate guide 10 includes a guide rail 11 which extends in coordinate direction (x) and which is movable in coordinate direction (y) on the stationary machine frame 2. The guide rail 11 bears a workpiece support 12 in the form of a sliding carriage 13 with clamps 14, 15. At the same time the work piece support 12 is movable in coordinate direction (x) facing the guide rail 11. By means of the clamps 14,15 the sheet metal is clamped. For the movement of the guide rail 11 as well as the work piece support 12, conventional motor drives are operated by the machine numerical control system or computer.

The support of the sheet metal 9 in the direction of gravity force is provided by the work table 8 which bears the sheet metal 9 over the punching implement lower tool 7. Self-supporting plates 16, 17 augment the workpiece table 8 in its function as a workpiece support.

The self-supporting plates 16, 17 are in each case fastened on the overhangs of the guide rail 11 and extend in the direction y the work table 8. On one corner set off from the guide rail 11, the self-supporting plates 16, 17 are connected to a longitudinal guide 18, 19 forming a support bearing for the self-supporting plates 16, 17, these are engaged on the lower part 3 of the machine frame on the longitudinal rails 20, 21 running in coordinate direction (y). The engagement of the longitudinal guides 18, 19 on the longitudinal rails 20, 21 is so constructed that the longitudinal guides 18, 19 can be moved only in coordinate direction (y) and motion in the coordinate direction (x) as well as tilting movements around the coordinate axes are thoroughly precluded.

As a result, the guide rail 11 is supported on the machine frame 2 and the self-supporting plates 16, 17; this results in elimination of undesired distortion and displacement of the guide rail 11, particularly in the plane defined by coordinate directions (x),(Y).

Bristles or balls can be provided on the plate surfaces supporting the sheet metal 9 of the self-supporting plates 16, 17 and on the upper side of the work table 8 to support the sheet metal 9 and decrease friction between the plate surfaces and the surface of the work table 8 on the one hand and the sheet metal under-surface on the other hand during the movement of the sheet metal 9 by means of the workpiece support 12 relative to the self-supporting plates 16, 17 and the work table 8.

In FIGS. 1 and 2, for the sake of completeness the longitudinal guides 22,23 are represented by means of which the guide rail 11 is mounted for movement on the longitudinal rails 20, 21 of the lower part 3 of the machine in the coordinate direction (y) and from which the guide rail 11 projects with its overhangs facing the work table 8. In the direction perpendicular to the coordinate direction (y), this bearing is thoroughly free of play.

Figure 3:
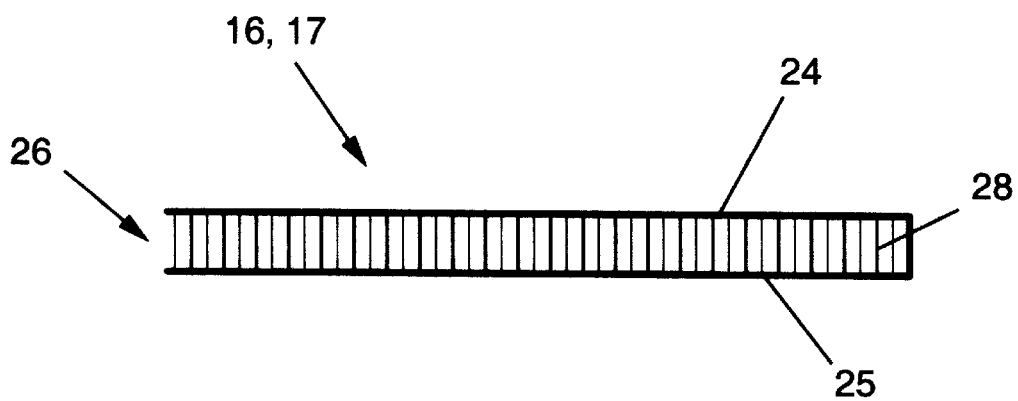
FIG. 3 is a cross sectional view of one of the self-supporting plates.
Figure 4:
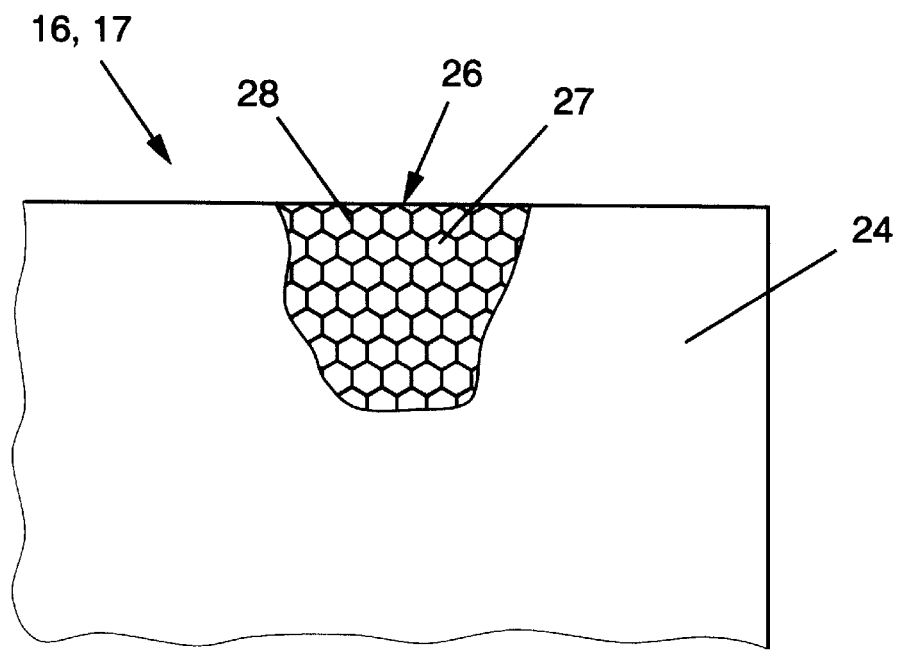
FIG. 4 is a partially cut-away top view of a self-supporting plate.

As can be seen in FIGS. 3 and 4, the self-supporting plates 16, 17 can be hollow chamber plates with an upper covering skin 24, a lower covering skin 25, and an inner honeycomb structure 26 in the cavity therebetween. The inner honeycomb structure 26 is formed from honeycomb partitions 28 running in a perpendicular to the skins 24,25 to the plane of the plate 16, 17 and define honeycomb cells 27. The upper covering skin 24, the lower covering skin 25, and the honeycomb partitions 28 desirably are fabricated from aluminum.

On the basis of the chosen design, the self-supporting plates 16, 17 provide minimal total weight with maximum self-supporting stability. Therefore the self-supporting plates 16, 17 are in a position both in the plane of the plate as well as crosswise to it to transfer the acting forces virtually free from distortion. The rigidity of the self-supporting plates 16, 17 in the direction perpendicular to the plane of the plates allows them to be supported in the direction of gravity at only a few hearing points on the machine frame 2. As is evident from FIG. 2, the bearing below the self-supporting plates 16, 17 on their corners lying opposite the longitudinal guides 18, 19 in coordinate direction (x) can be omitted.

Having thus described the invention, what is claimed is:

1. A machine tool for the processing of plate-like workpieces (9), including:

(a) a machine frame (2) having a processing station (5);

(b) a fixed work table (8) having its upper surface extending in a generally horizontal plane about said processing station;

(c) a coordinate guide assembly (10) for moving the workpiece in a second plane over said work table (8) parallel to said horizontal plane of said work table in two perpendicular coordinate directions (x, y), said coordinate guide assembly (10) comprising an elongated guide rail (11) mounted on said machine frame (2) and movable in a first coordinate direction (y) towards and away from said work station and at least one workpiece support (12) movable on said guide rail in the second coordinate direction (x), said rail (11) projecting a substantial distance beyond at least one side of said work table (8) to provide an overhang facing said work table (8), said coordinate guide (10) having a workpiece support on the overhang of the guide rail (11) movable with said guide rail (11) and facing said machine frame (2) to move the workpiece over said work table (8) relative to the processing station;

(d) said machine tool further including a rigid reinforcing element (16, 17) for said guide rail (11) along substantially the entire length of said overhang of said guide rail (11) and having a portion extending in the (y) coordinate direction to said machine frame (2), said portion of said reinforcing element being supported on said machine frame and being movable relative thereto in the (y) direction said reinforcing element being secured to said rail and movable therewith in said first (y) coordinate direction, said guide rail (11) being stiffened by said reinforcing element (16, 17) against distortion and displacement in a plane extending parallel to said horizontal plane of said work table, said reinforcing element (16, 17) comprising a self-supporting relatively light-weight plate with an upper surface which provides at least a part of the support for the workpiece in said second plane.

2. The machine tool in accordance with claim 1 wherein said self-supporting plate (16,17) movable with said guide rail (11) is supported on a support bearing (18,19) on said machine frame (2).

3. The machine tool in accordance with claim 1 wherein said self-supporting plate (16,17) has a pair of parallel skins defining a cavity therebetween.

4. The machine tool in accordance with claim 3 wherein said self-supporting plate (16,17) has an inner honeycomb structure (26) with honeycomb partitions (28).

5. The machine tool in accordance with claim 1 wherein said guide rail (11) projects beyond both sides of said work table (8) with overhangs facing said work table (8), and a workpiece support is provided on each of said overhangs of said guide rail (11) to form a workpiece contact with said work table (8), and a reinforcing element is provided between each of said overhangs of said guide rail (11) and said machine frame (2), both of said reinforcing elements comprising a self-supporting plate (16, 17) with an upper surface providing a part of the support for the workpiece in said second plane.

* * * * *